US012812616B2

(12) United States Patent
Hou et al.

(10) Patent No.: US 12,812,616 B2
(45) Date of Patent: Nov. 24, 2026

(54) DATA TRANSMISSION METHOD AND APPARATUS

(71) Applicant: HUAWEI TECHNOLOGIES CO., LTD., Shenzhen (CN)

(72) Inventors: Hailong Hou, Beijing (CN); Zhe Jin, Beijing (CN); Zhihu Luo, Beijing (CN); Weilin Qu, Beijing (CN); Zheng Yu, Beijing (CN); Xiaolei Tie, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 305 days.

(21) Appl. No.: 18/464,806

(22) Filed: Sep. 11, 2023

(65) Prior Publication Data

US 2023/0422231 A1 Dec. 28, 2023

Related U.S. Application Data

(63) Continuation of application No. PCT/CN2022/077880, filed on Feb. 25, 2022.

(30) Foreign Application Priority Data

Mar. 12, 2021 (CN) ......................... 202110269363.5

(51) Int. Cl.
*H04W 72/04* (2023.01)
*H04W 72/0453* (2023.01)
*H04W 72/23* (2023.01)

(52) U.S. Cl.
CPC ....... *H04W 72/0453* (2013.01); *H04W 72/23* (2023.01)

(58) Field of Classification Search
CPC .......................... H04W 72/0453; H04W 72/23
See application file for complete search history.

(56) References Cited

U.S. PATENT DOCUMENTS 5,515,366 A * 5/1996 Chieu ............... H04M 1/72513
2020/0077283 A1* 3/2020 Zhou .................. H04B 7/06964
(Continued)

FOREIGN PATENT DOCUMENTS

CN 112351496 A 2/2021
EP 3609261 A1 2/2020
(Continued)

OTHER PUBLICATIONS

Extended European Search Report in European Appln No. 22766164.2, dated Jul. 30, 2024, 10 pages.
(Continued)

*Primary Examiner* — Ronald B Abelson
(74) *Attorney, Agent, or Firm* — Fish & Richardson P.C.

(57) ABSTRACT

The present disclosure relates to data transmission methods and apparatuses. One example method includes receiving first information from a network device on a first frequency domain resource, where the first information indicates to switch to a second frequency domain resource, determining a first time unit based on the first information, where the first time unit includes a second time unit, switching from the first frequency domain resource to the second frequency domain resource in the second time unit, and performing data transmission on at least one of the first frequency domain resource or the second frequency domain resource in a period of time other than the second time unit in the first time unit.

17 Claims, 8 Drawing Sheets

(56) References Cited

U.S. PATENT DOCUMENTS

| | | | | |
|---|---|---|---|---|
| 2020/0351738 | A1 | 11/2020 | Huang et al. | |
| 2021/0194538 | A1* | 6/2021 | Kilian | H04L 5/0048 |
| 2022/0006599 | A1* | 1/2022 | Wang | H04L 5/0096 |
| 2022/0264402 | A1* | 8/2022 | Nemeth | H04W 72/0453 |
| 2022/0279485 | A1* | 9/2022 | Yang | H04W 72/04 |

FOREIGN PATENT DOCUMENTS

| | | | |
|---|---|---|---|
| EP | 3661294 | A1 | 6/2020 |
| KR | 102156695 | B1 | 9/2020 |
| WO | 2020232116 | A1 | 11/2020 |
| WO | 2021026926 | A1 | 2/2021 |

OTHER PUBLICATIONS

Ericsson, "New SID on support of reduced capability NR devices," 3GPP TSG RAN Meeting #86, RP-193238, Dec. 9-12, 2019, 5 pages.

International Search Report and Written Opinion in International Appln. No. PCT/CN2022/077880, mailed on May 10, 2022, 17 pages (with English translation).

Office Action in Indian Appln. No. 202317064643, mailed on Mar. 26, 2026, 7 pages.

EP Communication Pursuant to Article 94(3) EPC in European Appln. No. 22766164.2, mailed on Sep. 25, 2026, 9 pages.

* cited by examiner

DATA TRANSMISSION METHOD AND APPARATUS

CROSS-REFERENCE TO RELATED APPLICATIONS

This application is a continuation of International Application No. PCT/CN2022/077880, filed on Feb. 25, 2022, which claims priority to Chinese Patent Application No. 202110269363.5, filed on Mar. 12, 2021. The disclosures of the aforementioned applications are hereby incorporated by reference in their entireties.

TECHNICAL FIELD

This application relates to the field of communication technologies, and in particular, to a data transmission method and an apparatus.

BACKGROUND

A concept of a bandwidth part (bandwidth part, BWP) is introduced in a new radio (new radio, NR) system. One BWP is a segment of continuous frequency resources on one carrier. One or more BWPs may be configured for one terminal device in one serving cell (serving cell), but only one uplink BWP and one downlink BWP can be activated at the same time, and the terminal device can perform data transmission only on the activated BWP. When a plurality of BWPs are configured for the terminal device in the serving cell, BWP switching is supported in the NR system to enable the terminal device to receive and send data on different BWPs based on service requirements.

BWP switching is implemented in a plurality of methods. For example, a network device may send downlink control information (downlink control information, DCI) to a terminal device, to indicate the terminal device to perform BWP switching by using the DCI. For example, the network device may send radio resource control (radio resource control, RRC) signaling to the terminal device, to indicate the terminal device to perform BWP switching by using the RRC signaling.

For the BWP switching indicated by using the DCI, the network device indicates the terminal device to perform the BWP switching by using DCI for scheduling data transmission of a physical downlink shared channel (physical downlink shared channel, PDSCH) or physical uplink shared channel (physical uplink shared channel, PUSCH). To be specific, when indicating the terminal device to perform the BWP switching by using the DCI, the network device schedules transmission of one PDSCH or PUSCH, and the scheduled data transmission needs to be performed on a switched BWP. Before receiving the DCI and the scheduled data transmission, the terminal device performs a BWP switching process, and does not send or receive any data in the BWP switching process.

In conclusion, it can be learned that, in the conventional technology, the terminal device cannot perform data transmission in the BWP switching process, thereby affecting a data throughput rate of the terminal device.

SUMMARY

An objective of this application is to provide a data transmission method and an apparatus, to reduce impact of frequency domain resource switching on data transmission of a terminal device, and improve a data throughput rate of the terminal device.

According to a first aspect, this application provides a data transmission method. The method is applicable to a scenario in which a network device configures a plurality of frequency domain resources for a terminal device. The method is performed by the terminal device or one module in the terminal device. An example in which the method is performed by the terminal device is used herein for description. The method includes: receiving first information from the network device on a first frequency domain resource, where the first information indicates to switch to a second frequency domain resource; determining a first time unit based on the first information, where the first time unit includes a second time unit; and switching from the first frequency domain resource to the second frequency domain resource in the second time unit, and performing data transmission on the first frequency domain resource and/or the second frequency domain resource in a period of time other than the second time unit in the first time unit.

According to the foregoing method, the terminal device may perform the data transmission in a period of time other than time for frequency domain resource switching in the first time unit, to improve a data throughput rate of the data transmission, reduce a data transmission delay, and reduce impact of frequency domain resource switching on the data transmission. In addition, faster switching between different frequency domain resources can be implemented, to obtain a higher frequency diversity or selective scheduling gain, a faster load balancing effect, and faster avoidance of a high-priority service.

In a possible implementation, the performing data transmission on the first frequency domain resource and/or the second frequency domain resource in the first time unit includes: performing data transmission on the first frequency domain resource between a start moment of the first time unit and a start moment of the second time unit; and/or performing data transmission on the second frequency domain resource between an end moment of the second time unit and an end moment of the first time unit.

According to the foregoing method, the data transmission is separately performed on the first frequency domain resource and/or the second frequency domain resource based on a position of the frequency domain resource switching, so that resources in the first frequency domain resource and/or the second frequency domain resource can be fully utilized, thereby improving resource utilization.

In a possible implementation, the start moment of the first time unit is after a moment at which the first information is received.

The first information further indicates at least one of a length, the start moment, and the end moment of the first time unit.

The first time unit is indicated by the first information, to ensure that the network device and the terminal device have a consistent understanding of the first time unit, and avoid interference to data transmitted on the second frequency domain resource.

In a possible implementation, the method further includes receiving second information from the network device, where the second information indicates to transmit the data on the second frequency domain resource at a specified moment, and the second information and the first information are included in a same message.

The end moment of the first time unit is the specified moment indicated by the second information.

A data transmission moment indicated on the second frequency domain resource is used as the end moment of the first time unit to help the network device perform data scheduling on the terminal device on the second frequency domain resource, to avoid a data transmission conflict.

In a possible implementation, the method further includes receiving third information from the network device, where the third information indicates to perform transmission by using the first frequency domain resource and/or the second frequency domain resource in the period of time other than the second time unit in the first time unit.

The network device may flexibly indicate, by using the third information, whether the terminal device performs the data transmission in the period of time other than the second time unit in the first time unit and how to perform the data transmission. This improves flexibility of network scheduling, and ensures user data transmission performance.

In a possible implementation, the method further includes: a position of the second time unit in the first time unit is indicated by the network device, or a position of the second time unit in the first time unit is preset.

In a possible implementation, the start moment of the first time unit overlaps the start moment of the second time unit, or the end moment of the first time unit overlaps the end moment of the second time unit.

When the start moment of the first time unit overlaps the start moment of the second time unit, the terminal device may perform the frequency domain resource switching in time, so that high-priority data transmitted on the first frequency domain resource can be urgently avoided, faster load balancing can be implemented, and the higher frequency diversity or selective scheduling gain is obtained. When the end moment of the first time unit overlaps the end moment of the second time unit, if the terminal device continues to perform data transmission when receiving the first information, the terminal device may parse the first information when preparing a parameter required for the frequency domain switching. This reduces a requirement for a capability of the terminal to prepare a switching process more quickly, and helps reduce complexity and power consumption of the terminal.

In a possible implementation, the first frequency domain resource and the second frequency domain resource have different index values, or the first frequency domain resource and the second frequency domain resource have a same index value and different frequency domain positions.

According to a second aspect, this application provides a data transmission method. The method is applicable to a scenario in which a network device configures a plurality of frequency domain resources for a terminal device. The method is performed by the network device or one module in the network device. An example in which the method is performed by the network device is used herein for description. The method includes: sending first information to the terminal device on a first frequency domain resource, where the first information indicates to switch to a second frequency domain resource; and performing data transmission on the first frequency domain resource and/or the second frequency domain resource in a period of time other than a second time unit in a first time unit, where the first information indicates the first time unit, the first time unit includes the second time unit, and the second time unit is for switching from the first frequency domain resource to the second frequency domain resource.

In a possible implementation, the performing data transmission on the first frequency domain resource and/or the second frequency domain resource in a first time unit includes: performing data transmission on the first frequency domain resource between a start moment of the first time unit and a start moment of the second time unit; and/or performing data transmission on the second frequency domain resource between an end moment of the second time unit and an end moment of the first time unit.

In a possible implementation, the start moment of the first time unit is after a moment at which the first information is received.

The first information further indicates at least one of a length, the start moment, and the end moment of the first time unit.

In a possible implementation, the method further includes sending second information to the terminal device, where the second information indicates to transmit data on the second frequency domain resource at a specified moment, and the second information and the first information are included in a same message. The end moment of the first time unit is the specified moment indicated by the second information.

In a possible implementation, the method further includes sending third information to the terminal device, where the third information indicates to perform transmission by using the first frequency domain resource and/or the second frequency domain resource in the period of time other than the second time unit in the first time unit.

In a possible implementation, the method further includes: a position of the second time unit in the first time unit is indicated by the network device, or a position of the second time unit in the first time unit is preset.

In a possible implementation, the start moment of the first time unit overlaps the start moment of the second time unit, or the end moment of the first time unit overlaps the end moment of the second time unit.

In a possible implementation, the first frequency domain resource and the second frequency domain resource have different index values, or the first frequency domain resource and the second frequency domain resource have a same index value and different frequency domain positions.

It should be noted that the method described in the second aspect corresponds to the method described in the first aspect. For a beneficial effect of a related technical feature in the method described in the second aspect, refer to the descriptions of the first aspect. Details are not described again.

According to a third aspect, this application provides a data transmission method. The method is applicable to a scenario in which a network device configures a plurality of frequency domain resources for a terminal device. The method is performed by the terminal device or one module in the terminal device. An example in which the method is performed by the terminal device is used herein for description. The method includes: receiving control information from the network device on a first frequency domain resource, where the control information indicates to perform data transmission on a second frequency domain resource, and indicates a start moment of the data transmission; and switching to the second frequency domain resource based on the control information, and performing the data transmission on the second frequency domain resource, where a slot in which the control information is located and a slot in which the terminal device completes frequency domain resource switching based on the control information are a same slot, and a moment at which the terminal device completes the frequency domain resource switching is an end moment (or referred to as a tail boundary) of the slot.

According to the foregoing method, a period of time from a moment at which the terminal device receives the control information to the end moment of the slot in which the control information is received may be equal to a frequency domain resource switch delay required by the terminal device. In this way, when receiving the control information in one slot, the terminal device immediately performs the frequency domain resource switching. A moment at which the switching is completed is exactly the end moment of the slot. This can prevent the frequency domain resource switching from crossing a plurality of slots. Therefore, it can be ensured that a complete slot can be used for the data transmission in a next slot of the slot. Because the terminal device performs the data transmission based on a slot granularity, implementation of signal receiving and detection of the terminal device is facilitated.

In a possible implementation, an end moment of the frequency domain resource switching overlaps the start moment of the data transmission indicated by the control information.

In a possible implementation, duration between an end moment of receiving the control information and a start moment of a third time unit is equal to the frequency domain resource switch delay required for the frequency domain resource switching.

According to a fourth aspect, this application provides a data transmission method. The method is applicable to a scenario in which a network device configures a plurality of frequency domain resources for a terminal device. The method is performed by the network device or one module in the network device. An example in which the method is performed by the network device is used herein for description. The method includes: sending control information to the terminal device on a first frequency domain resource, where the control information indicates to perform data transmission on a second frequency domain resource, and indicates a start moment of the data transmission; and performing the data transmission with the terminal device on the second frequency domain resource, where a slot in which the control information is located and a slot in which the terminal device completes frequency domain resource switching based on the control information are a same slot, and a moment at which the terminal device completes the frequency domain resource switching is an end moment (or referred to as a tail boundary) of the slot.

In a possible implementation, an end moment of the frequency domain resource switching overlaps the start moment of the data transmission indicated by the control information.

In a possible implementation, duration between an end moment of receiving the control information and a start moment of a third time unit is equal to a frequency domain resource switch delay required for the frequency domain resource switching.

According to a fifth aspect, this application further provides a communication apparatus. The communication apparatus has a function of implementing any method provided in the first aspect or the third aspect. The communication apparatus may be implemented by hardware, or may be implemented by hardware executing corresponding software. The hardware or the software includes one or more units or modules corresponding to the function.

In a possible implementation, the communication apparatus includes a processor, and the processor is configured to support the communication apparatus in performing a corresponding function of the terminal device in the foregoing method. The communication apparatus may further include a memory. The memory may be coupled to the processor, and the memory stores program instructions and data that are necessary for the communication apparatus. Optionally, the communication apparatus further includes a communication interface, and the communication interface is configured to support communication between the communication apparatus and a device, for example, a network device.

In a possible implementation, the communication apparatus includes corresponding functional modules, respectively configured to implement steps in the foregoing method. The function may be implemented by hardware, or may be implemented by hardware executing corresponding software. The hardware or the software includes one or more modules corresponding to the function.

In a possible implementation, a structure of the communication apparatus includes a processing unit and a communication unit. These units may perform corresponding functions in the foregoing method examples. For details, refer to the descriptions in the method provided in the fifth aspect. Details are not described herein.

According to a sixth aspect, this application further provides a communication apparatus. The communication apparatus has a function of implementing any method provided in the second aspect or the fourth aspect. The communication apparatus may be implemented by hardware, or may be implemented by hardware executing corresponding software. The hardware or the software includes one or more units or modules corresponding to the function.

In a possible implementation, the communication apparatus includes a processor, and the processor is configured to support the communication apparatus in performing a corresponding function of the network device in the foregoing method. The communication apparatus may further include a memory. The memory may be coupled to the processor, and the memory stores program instructions and data that are necessary for the communication apparatus. Optionally, the communication apparatus further includes a communication interface, and the communication interface is configured to support communication between the communication apparatus and a device, for example, a terminal device.

In a possible implementation, the communication apparatus includes corresponding functional modules, respectively configured to implement steps in the foregoing method. The function may be implemented by hardware, or may be implemented by hardware executing corresponding software. The hardware or the software includes one or more modules corresponding to the function.

In a possible implementation, a structure of the communication apparatus includes a processing unit and a communication unit. These units may perform corresponding functions in the foregoing method examples. For details, refer to the descriptions in the method provided in the fifth aspect. Details are not described herein.

According to a seventh aspect, a communication apparatus is provided, and includes a processor and an interface circuit. The interface circuit is configured to: receive a signal from a communication apparatus other than the communication apparatus and transmit the signal to the processor, or send a signal from the processor to a communication apparatus other than the communication apparatus. The processor is configured to implement the method according to the first aspect or any possible implementation of the first aspect by using a logic circuit or by executing code instructions.

According to an eighth aspect, a communication apparatus is provided, and includes a processor and an interface circuit. The interface circuit is configured to: receive a signal from a communication apparatus other than the communication apparatus and transmit the signal to the processor, or send a signal from the processor to a communication apparatus other than the communication apparatus. The processor is configured to implement a functional module of the method according to the second aspect or any possible implementation of the second aspect by using a logic circuit or by executing code instructions.

According to a ninth aspect, a communication apparatus is provided, and includes a processor and an interface circuit. The interface circuit is configured to: receive a signal from a communication apparatus other than the communication apparatus and transmit the signal to the processor, or send a signal from the processor to a communication apparatus other than the communication apparatus. The processor is configured to implement a functional module of the method according to the third aspect or any possible implementation of the third aspect by using a logic circuit or by executing code instructions.

According to a tenth aspect, a communication apparatus is provided, and includes a processor and an interface circuit. The interface circuit is configured to: receive a signal from a communication apparatus other than the communication apparatus and transmit the signal to the processor, or send a signal from the processor to a communication apparatus other than the communication apparatus. The processor is configured to implement a functional module of the method according to the fourth aspect or any possible implementation of the fourth aspect by using a logic circuit or by executing code instructions.

According to an eleventh aspect, a computer-readable storage medium is provided. The computer-readable storage medium stores a computer program or instructions. When the computer program or the instructions are executed by a processor, the method in any one of the first aspect to the fourth aspect and any possible implementation of any one of the first aspect to the fourth aspect is implemented.

According to a twelfth aspect, a computer program product including instructions is provided. When the instructions are run by a processor, the method in any one of the first aspect to the fourth aspect and any possible implementation of any one of the first aspect to the fourth aspect is implemented.

According to a thirteenth aspect, a chip system is provided. The chip system includes a processor, and may further include a memory, configured to implement the method in any one of the first aspect to the fourth aspect and any possible implementation of any one of the first aspect to the fourth aspect. The chip system may include a chip, or may include a chip and another discrete device.

According to a fourteenth aspect, a communication system is provided. The system includes the apparatus (for example, a terminal device) according to the seventh aspect and the apparatus (for example, a network device) according to the eighth aspect.

According to a fifteenth aspect, a communication system is provided. The system includes the apparatus (for example, a network device) according to the ninth aspect and the apparatus (for example, a terminal device) according to the tenth aspect.

DESCRIPTION OF EMBODIMENTS

Figure 1:
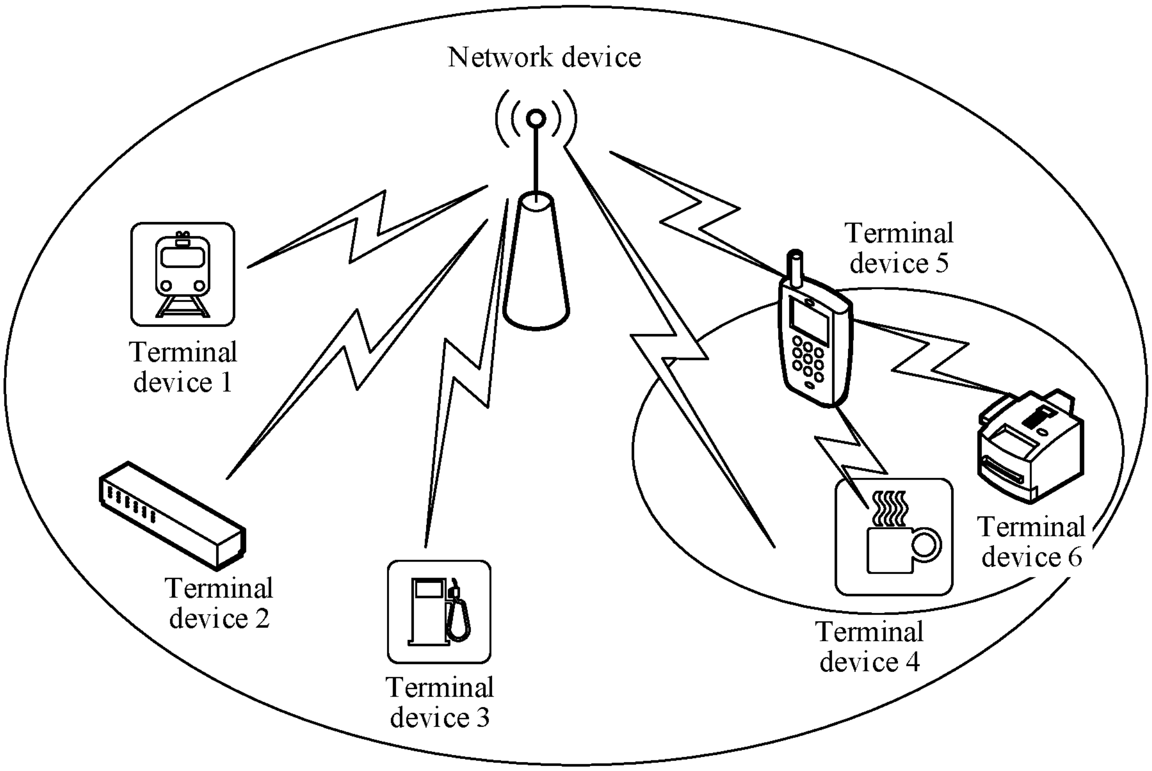
FIG. 1 is a schematic diagram of a network architecture applicable to an embodiment of this application.

The following describes embodiments of this application in detail with reference to this specification.

Technical solutions in embodiments of this application may be applied to various communication systems such as a long term evolution (long term evolution, LTE) system, an LTE frequency division duplex (frequency division duplex, FDD) system, an LTE time division duplex (time division duplex, TDD) system, and an NR system. This is not limited herein.

In embodiments of this application, a terminal device may be a device that has a wireless transceiver function. The terminal device may be deployed on the land, including an indoor or outdoor device, or a handheld or vehicle-mounted device, may be deployed on a water surface (for example, on a ship), or may be deployed in the air (for example, on an airplane, a balloon, and a satellite). The terminal device may be user equipment (user equipment, UE), and the UE includes a handheld device, a vehicle-mounted device, a wearable device, or a computing device that has a wireless communication function. For example, the UE may be a mobile phone (mobile phone), a tablet computer, or a computer that has a wireless transceiver function. Alternatively, the terminal device may be a virtual reality (virtual reality, VR) terminal device, an augmented reality (augmented reality, AR) terminal device, a wireless terminal in industrial control, a wireless terminal in self-driving, or the like. In embodiments of this application, an apparatus configured to implement a function of the terminal device may alternatively be an apparatus that can support the terminal device in implementing the function, for example, a chip system. The apparatus may be installed in a terminal. The chip system may include a chip, or may include a chip and another discrete device.

The terminal device in this application may be a first-type terminal device or a second-type terminal device. The first-type terminal device and the second-type terminal device may have at least one of the following distinguishing features:

1. Bandwidth capabilities are different. For example, bandwidth supported by the first-type terminal device is less than bandwidth supported by the second-type terminal device.
2. Quantities of transmit and receive antennas are different. For example, a quantity of transmit and receive antennas supported by the first-type terminal device is less than a quantity of transmit and receive antennas supported by the second-type terminal device.
3. Maximum uplink transmit power is different. For example, maximum uplink transmit power supported by the first-type terminal device is less than maximum uplink transmit power supported by the second-type terminal device.
4. Protocol releases are different. For example, the first-type terminal device may be a terminal device in an NR release-17 (release-17, Rel-17) or a later release of the NR Rel-17. The second-type terminal device may be, for example, a terminal device in an NR release-15 (release-15, Rel-15) or an NR release-16 (release-16, Rel-16). The second-type terminal device may also be referred to as an NR legacy (NR legacy) terminal device.
5. Data processing capabilities are different. For example, a minimum delay between receiving downlink data and sending a feedback on the downlink data by the first-type terminal device is greater than a minimum delay between receiving downlink data and sending a feedback on the downlink data by the second-type terminal device; and/or a minimum delay between sending uplink data and receiving a feedback on the uplink data by the first-type terminal device is greater than a minimum delay between sending uplink data and receiving a feedback on the uplink data by the second-type terminal device.

In a possible implementation, the first-type terminal device may be a reduced capability (reduced capability, REDCAP) terminal device. Alternatively, the first-type terminal device may be a reduced capability terminal device, a reduced capacity terminal device, REDCAP UE, Reduced Capacity UE, a narrow-band NR (narrow-band NR, NB-NR) UE, or the like. The second-type terminal device may be a legacy capability terminal device, a normal capability terminal device, or a high capability terminal device, which may also be referred to as a legacy (legacy) terminal device or a normal (normal) terminal device. The second-type terminal device and the first-type terminal device have but are not limited to the distinguishing features.

In embodiments of this application, a network device may be radio access devices in various standards, for example, may be a next generation NodeB (next generation NodeB, gNB) in an NR system, may be an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), an access point (access point, AP) in a wireless fidelity (wireless fidelity, Wi-Fi) system, a wireless relay node, a wireless backhaul node, a transmission point (a transmission and reception point, TRP or a transmission point, TP), or the like, may be a gNB or a transmission point (a TRP or a TP) in an NR system, or one or one group of (including a plurality of antenna panels) antenna panels of a base station in a 5G system, or may be a network node that forms a gNB or a transmission point, for example, a baseband unit (BBU), or a DU in a central unit-distributed unit (central unit-distributed unit, CU-DU) architecture.

For ease of understanding embodiments of this application, a communication system shown in FIG. 1 is first used as an example to describe in detail a communication system applicable to embodiments of this application. FIG. 1 is a schematic diagram of a communication system applicable to an embodiment of this application. As shown in FIG. 1, a communication system includes a base station and a terminal device 1 to a terminal device 6. In the communication system, the base station sends information to one or more terminal devices in the terminal device 1 to the terminal device 6. In addition, a communication system alternatively includes a terminal device 4 to the terminal device 6. In the communication system, a terminal device 5 may send information to one or more terminal devices of the terminal device 4 and the terminal device 6.

In this embodiment of this application, a network device may configure a plurality of uplink BWPs and downlink BWPs on each carrier for the terminal device, for uplink transmission and downlink transmission respectively. For a same carrier, each terminal can activate only one BWP at the same time, and the terminal can transmit data only on the activated BWP. In an actual application process, the terminal device may switch from one BWP to another BWP. Currently, BWP switching mainly includes the following three implementations:

Implementation 1: RRC Signaling-Based BWP Switching.

The RRC signaling-based BWP switching is that the network device indicates the terminal device to perform BWP switching by using RRC signaling. The RRC signaling-based BWP switching is mainly for enabling the terminal device to work on a new BWP after an RRC reconfiguration message is delivered or a secondary component carrier is activated.

The RRC signaling-based BWP switching enables the terminal device to immediately enter a proper BWP to perform data transmission after RRC reconfiguration or activation of the secondary component carrier, instead of staying on an initial (initial) BWP.

Implementation 2: DCI-Based BWP Switching.

The DCI-based BWP switching is that the network device indicates the terminal device to perform BWP switching by using DCI. The DCI schedules the terminal device to perform PDSCH or PUSCH data transmission at the same time. The data transmission scheduled by the DCI needs to be performed in a BWP corresponding to a BWP index (index) carried in the DCI. When the terminal device determines that the BWP index in the DCI is different from an index of a BWP receiving the DCI, the terminal device switches to the BWP corresponding to the BWP index carried in the DCI.

Implementation 3: Timer-Based BWP Switching.

In this implementation, a network side may configure a BWP-inactivity timer (BWP-inactivity timer). After completing data transmission, the terminal device may start the BWP-inactivity timer. If the BWP-inactivity timer of the terminal device in a current BWP expires, and there is no data that needs to be transmitted by the terminal device, the terminal device may switch to a BWP with small bandwidth, for example, switch to a default BWP (default BWP), so that energy can be saved.

A specific delay is required for the terminal device to perform BWP switching. For example, for the DCI-based BWP switching, two different types (type) of BWP switch delays are defined in an NR system based on different capabilities of the terminal device. Details are shown in Table 1.

TABLE 1

| | NR slot | BWP switch delay $T_{BWPswitchDelay}$ (slot) | |
|---|---|---|---|
| μ | length (ms) | Type 1 | Type 2 |
| 0 | 1 | 1 | 3 |
| 1 | 0.5 | 2 | 5 |
| 2 | 0.25 | 3 | 9 |
| 3 | 0.125 | 6 | 17 |

μ is a parameter corresponding to a subcarrier spacing at which the terminal device works. To be specific, the subcarrier spacing at which the terminal device works is $2^{\mu}\cdot 15$ kHz. The terminal device may report, to the network device, whether a BWP switching capability supported by the terminal device is the type 1 or the type 2.

Currently, in a BWP switching process, the terminal device needs to decode the received DCI, needs to reload configuration parameter information of the switched BWP, and further needs to adjust a radio frequency channel based on a configuration parameter of the switched BWP. Therefore, within the BWP switch delay $T_{BWPswitchDelay}$, the terminal device is not required to perform data transmission. It should be noted that, currently, a delay required by each of the foregoing three processes is not specifically distinguished, and a total BWP switch delay is defined only for an entire BWP switching process.

In addition, for the DCI-based BWP switching, a delay between a moment of the data transmission scheduled by the DCI and a DCI sending moment may be referred to as a scheduling delay, and the scheduling delay cannot be less than a BWP switch delay.

Figure 2:
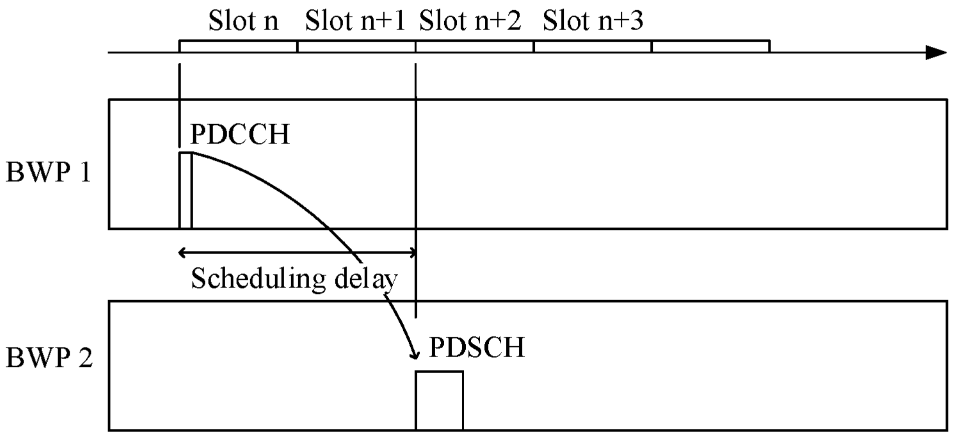
FIG. 2 is a schematic diagram of a scheduling delay according to an embodiment of this application.

For example, as shown in FIG. 2, in a slot n, the terminal device receives DCI in a BWP 1 through a PDCCH, and the DCI indicates the terminal device to receive a PDSCH in a slot n+2 by using a BWP 2. It is assumed that subcarrier spacings of the BWP 1 and the BWP 2 are 15 kHz, and a BWP switching capability supported by the terminal device is the type 1. In this example, a BWP switch delay is one slot, and a scheduling delay is two slots.

In a current protocol, the terminal device cannot perform data transmission in the BWP switching process. Therefore, a data throughput rate is reduced. Embodiments of this application provide a method, to improve data transmission efficiency and the data throughput rate.

A network architecture and a service scenario described in embodiments of this application are intended to describe the technical solutions in embodiments of this application more clearly, and do not constitute any limitation on the technical solutions provided in embodiments of this application. A person of ordinary skill in the art may know that with evolution of the network architecture and emergence of a new service scenario, the technical solutions provided in embodiments of this application are also applicable to similar technical problems.

In embodiments of this application, interaction between the network device and the terminal device is used as an example for description. Alternatively, an operation performed by the network device may be performed by a chip or a module inside the network device, and an operation performed by the terminal device may be performed by a chip or a module inside the terminal device.

Figure 3:
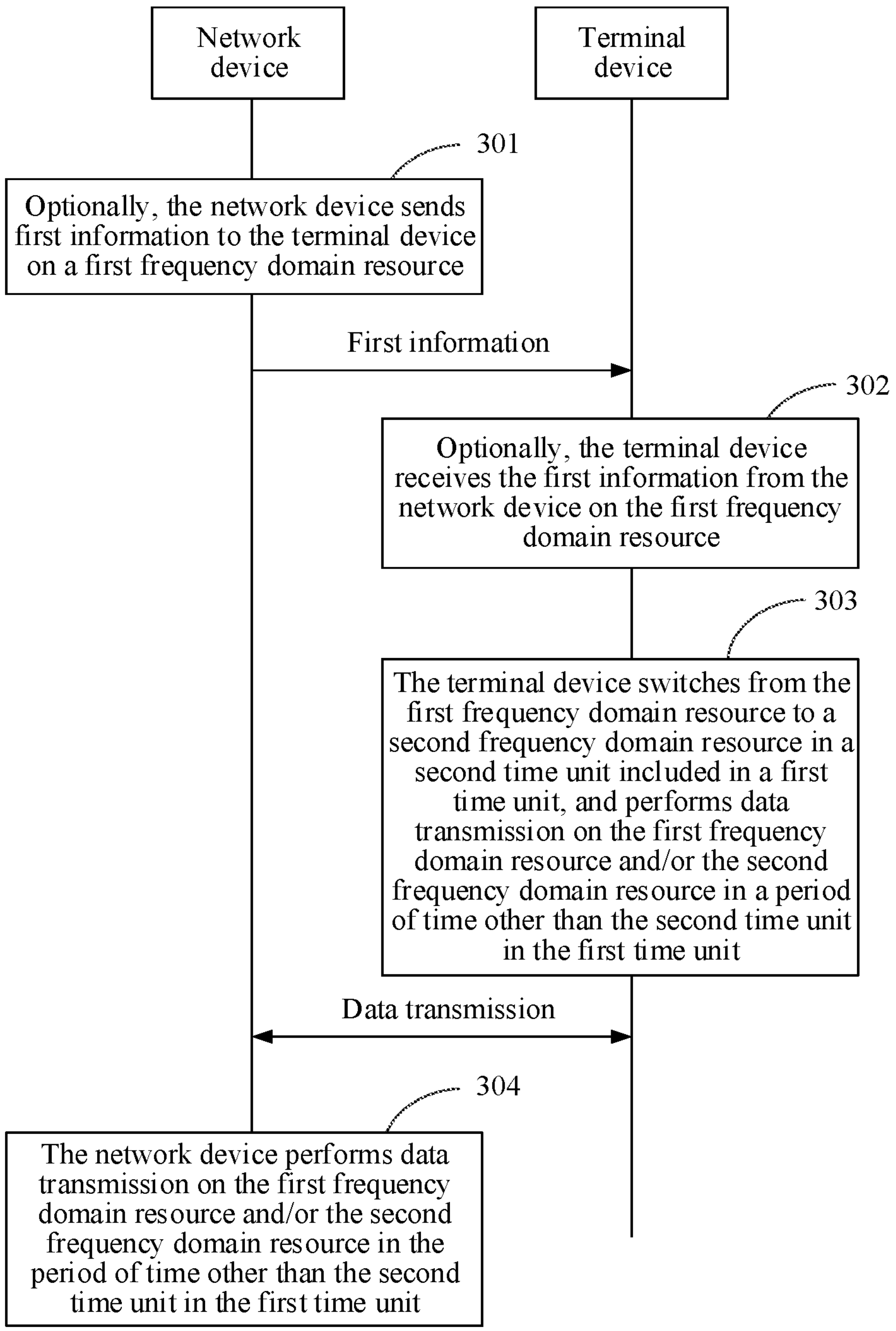
FIG. 3 is a schematic flowchart of a data transmission method according to an embodiment of this application.

With reference to the foregoing descriptions, FIG. 3 is a schematic flowchart of a data transmission method according to an embodiment of this application. The method includes the following steps.

Optionally, S301: A network device sends first information to a terminal device on a first frequency domain resource.

Optionally, S302: The terminal device receives the first information from the network device on the first frequency domain resource.

The first information may indicate the terminal device to switch to a second frequency domain resource. It should be noted that the first information may not directly indicate the terminal device to perform switching, and the first information may include a second identifier of the second frequency domain resource. When determining that a first identifier of the first frequency domain resource is different from the second identifier included in the first information, the terminal device may determine that the terminal device needs to switch to the second frequency domain resource corresponding to the second identifier.

The first information may be sent to the terminal device by using DCI, RRC signaling, a medium access control (medium access control, MAC) control element (control element, CE), or a system broadcast message. A specific implementation is not limited in this embodiment of this application.

The network device may further send second information to the terminal device, where the second information indicates the terminal device to transmit data on the second frequency domain resource at a specified moment after switching to the second frequency domain resource. The second information may indicate the terminal device to receive data on a PDSCH of the second frequency domain resource, or may indicate the terminal device to send data on a PUSCH of the second frequency domain resource.

It should be noted that the first information and the second information may be carried in one message, for example, carried in one piece of DCI, or may be separately carried in two messages, for example, carried in two pieces of DCI. This is not limited in this application.

In this embodiment of this application, a frequency domain resource may be a segment of continuous frequency resources, for example, may be a BWP, or a frequency domain resource similar to a BWP.

It should be noted that, in this embodiment of this application, if the frequency domain resource is a BWP, switching from the first frequency domain resource to the second frequency domain resource may be referred to as BWP switching, or may be referred to as BWP frequency hopping, BWP sliding, BWP readjustment, or radio frequency readjustment. All the foregoing descriptions may be considered as equivalent.

In this embodiment of this application, if at least one of the following configuration parameters corresponding to the first frequency domain resource and the second frequency domain resource is different, it may be considered that the two frequency domain resources are different.

An index value of the first frequency domain resource is different from an index value of the second frequency domain resource.

A frequency domain position of the first frequency domain resource is different from a frequency domain position of the second frequency domain resource.

A center frequency corresponding to the first frequency domain resource is different from a center frequency corresponding to the second frequency domain resource.

A subcarrier spacing (subcarrier spacing, SCS) corresponding to the first frequency domain resource is different from an SCS corresponding to the second frequency domain resource.

A quantity of multiple input multiple output (multiple input multiple output, MIMO) data transmission layers or antennas corresponding to the first frequency domain resource is different from a quantity of MIMO data transmission layers or antennas corresponding to the second frequency domain resource.

A physical channel configuration corresponding to the first frequency domain resource is different from a physical channel configuration corresponding to the second frequency domain resource, and a physical channel includes one or more of the following: a physical downlink control channel (physical downlink control channel, PDCCH), a PDSCH, a physical uplink control channel (physical uplink control channel, PUCCH), and a physical uplink shared channel (physical uplink shared channel, PUSCH).

In this embodiment of this application, when the network device indicates the terminal device to perform frequency domain resource switching, there is one piece of duration for the terminal device to perform the frequency domain resource switching. The duration may be referred to as a first time unit. However, a frequency domain resource switch delay required by the terminal device to perform the frequency domain resource switching is less than or equal to the duration, that is, less than or equal to the first time unit. Therefore, in this embodiment of this application, in the first time unit, in addition to time required for completing the frequency domain resource switching, other time may be for data transmission.

S303: The terminal device switches from the first frequency domain resource to the second frequency domain resource in a second time unit included in the first time unit, and performs data transmission on the first frequency domain resource and/or the second frequency domain resource in a period of time other than the second time unit in the first time unit.

In this embodiment of this application, the word "data transmission" may represent sending data, may represent receiving data, or may represent sending data and receiving data. The data includes control signaling and service data. A specific meaning of the word "data transmission" may be determined based on an actual application scenario. If the word represents sending data, the terminal device may send the data to the network device on the first frequency domain resource and/or the second frequency domain resource. If the word represents receiving data, the terminal device may receive the data from the network device on the first frequency domain resource and/or the second frequency domain resource.

The second time unit is time actually required by the terminal device to switch from the first frequency domain resource to the second frequency domain resource.

S304: The network device performs data transmission on the first frequency domain resource and/or the second frequency domain resource in the period of time other than the second time unit in the first time unit.

It should be noted that the data transmission in this step is that the network device may perform the data transmission on the first frequency domain resource and/or the second frequency domain resource in the period of time other than the second time unit in the first time unit. The terminal device has a capability of performing the data transmission in the first time unit, but this does not indicate that the terminal device definitely performs the data transmission in the first time unit. If there is no data that needs to be transmitted in the first time unit, the terminal device may not perform the data transmission in the first time unit.

Figure 4:
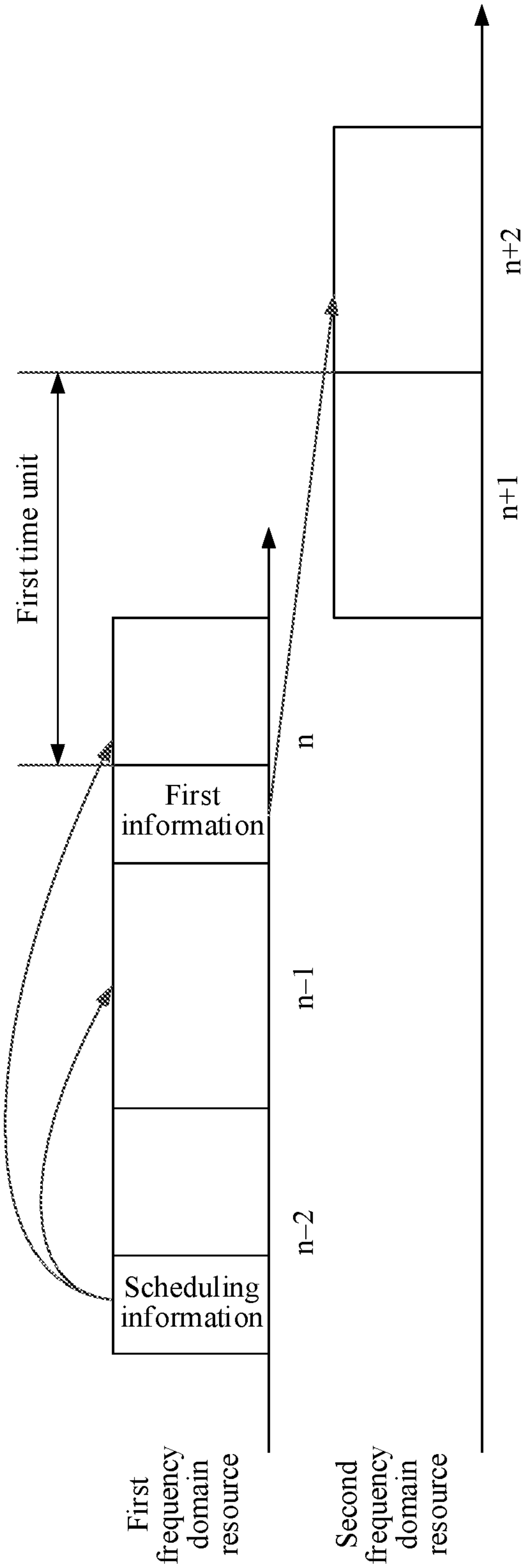
FIG. 4 is a schematic diagram of data transmission according to an embodiment of this application.

In a possible scenario, before sending the first information, the network device schedules the terminal device to perform data transmission on the first frequency domain resource. For example, as shown in FIG. 4, the network device may schedule, in a slot n−2 by using scheduling information, the terminal device to perform data transmission in a slot n and a slot n+1, where n is an integer, for example, may be 0 or 1. A specific value is not limited. Before data transmission of the terminal device ends, the network device further needs to indicate the terminal device to switch to the second frequency domain resource. For example, in FIG. 4, the network device sends the first information in the slot n, to indicate the terminal device to switch to the second frequency domain resource before a start moment of the slot n+2. In this embodiment of this application, after a moment at which the first information is sent and before the terminal device switches to the second frequency domain resource, data transmitted on the first frequency domain resource is scheduled, and the data may continue to be transmitted by using the first frequency domain resource and/or the second frequency domain resource in the first time unit. In other words, the data transmitted by the terminal device in the first time unit may be data that the network device schedules the terminal device to transmit on the first frequency domain resource before sending the first information.

The terminal device may independently determine whether to perform the data transmission in the first time unit, or may determine, based on the indication of the network device, whether to perform the data transmission in the first time unit. For example, the network device may send third information, where the third information indicates to perform data transmission by using the first frequency domain resource and/or the second frequency domain resource in the period of time other than the second time unit in the first time unit. It should be noted that the third information may not schedule the terminal device to transmit new data, but schedule the terminal device to transmit data that originally needs to be transmitted in the first time unit by using a first frequency domain resource unit on the first frequency domain resource and/or the second frequency domain resource.

The first information and the third information may be carried in one message, or may be separately carried in two messages. This is not limited in this application.

In another possible scenario, in the period of time other than the second time unit in the first time unit, the network device may further configure the terminal device to monitor a PDCCH on the first frequency domain resource or the second frequency domain resource. The network device may send DCI to the terminal device through the PDCCH, and the DCI schedules the terminal device to perform PDSCH or PUSCH data transmission on the first frequency domain resource or the second frequency domain resource. It should be noted that a time domain position of the PDSCH or PUSCH data transmission is not limited, and may be in the period of time other than the second time unit in the first time unit, or may be in a period of time after the first time unit. The terminal device performs the PDSCH or PUSCH data transmission based on the received DCI. In the period of time other than the second time unit in the first time unit, in addition to the PDCCH, PDSCH, and PUSCH channel transmission, the terminal device may further perform another channel or signal transmission on the first frequency domain resource or the second frequency domain resource, for example, a PUCCH, a physical random access channel (physical random access channel, PRACH), a synchronization signal block (synchronization signal block, SSB), a channel state information downlink signal (channel state information reference signal, CSI-RS), and a sounding reference signal (sounding reference signal, SRS).

In this embodiment of this application, the first time unit represents a period of time, and may include at least one orthogonal frequency division multiplexing (orthogonal frequency division multiplexing, OFDM) symbol, a slot (slot), or the like.

Similarly, the second time unit represents a period of time, and the second time unit is less than or equal to the first time unit, and is greater than or equal to a switch delay of the terminal device. For example, when the frequency domain resource is a BWP, the switch delay of the terminal device may be a BWP switch delay. For ease of description, in this embodiment of this application, the OFDM symbol is referred to as a symbol for short.

A specific length and a start moment of the first time unit may be configured by the network device, or may be agreed on in advance. This is not limited in this embodiment of this application. For example, in a first possible implementation, the length of the first time unit is preset duration, and may be specifically preconfigured by the network device, or may be agreed on in a protocol. This is not limited in this application.

In this implementation, if there is S301, the terminal device may determine a position of the first time unit based on the first information. For example, the terminal device may use a moment at which the first information is received or a moment after the moment at which the first information is received as a start moment of the first time unit. Correspondingly, the terminal device uses, as an end moment of the first time unit, a moment that is after the start moment of the first time unit and at which an interval from the start moment of the first time unit is preset duration.

For example, the terminal device receives the first information in the $1^{st}$ symbol in the slot n, and the preset duration is two slots. The terminal device may use an end moment of the $1^{st}$ symbol in the slot n as a start moment of the first time unit, and use an end moment of the $1^{st}$ symbol in the slot n+2 as an end moment of the first time unit.

For another example, the terminal device may alternatively use, as a start moment of the first time unit, a start moment of a slot in which the first information is received. For example, the terminal device receives the first information in the $3^{rd}$ symbol in the slot n, and the preset duration is two slots. The terminal device may use a start moment of the slot n as a start moment of the first time unit, and use the start moment of the slot n+2 as an end moment of the first time unit.

In this implementation, if there is no S301 and the terminal device performs timer-based frequency domain resource switching, the terminal device may use a timer expiration moment as a start moment of the first time unit, and use, as an end moment of the first time unit, a moment that is after the timer expiration moment and at which an interval from the timer expiration moment is preset duration.

It should be noted that for a specific process of the timer-based frequency domain resource switching, refer to the foregoing described timer-based BWP switching. Details are not described herein again.

In a second possible implementation, the first information may further indicate at least one of the length, the start moment, and the end moment of the first time unit.

For example, the terminal device receives the first information at a moment 1, and the first information indicates the terminal device to complete switching at a moment 2. In this case, the moment 2 may be used as an end moment of the first time unit, and a moment at which the first information is received or a moment after the moment at which the first information is received may be used as a start moment of the first time unit.

For another example, the terminal device receives the first information at the moment 1, and the first indication information indicates to use, as the start moment of the first time unit, the moment at which the first information is received, and indicates that the length of the first time unit is two slots.

It should be noted that if the first information indicates the end moment of the first time unit, any moment between the moment at which the first information is received and the end moment of the first time unit may be used as a start moment of the first time unit as long as it is ensured that duration of the first time unit is greater than the frequency domain resource switch delay.

The foregoing is merely an example. The first information may alternatively indicate the length, the start moment, and the end moment of the first time unit in another manner. Details are not described herein one by one.

In a third possible implementation, the network device may further determine the length, the start moment, and the end moment of the first time unit based on the second information. Because the second information indicates the terminal device to transmit the data on the second frequency domain resource at the specified moment, the specified moment may be used as the end moment of the first time unit. In this case, the start moment of the first time unit may be between a moment at which the first information or the second information is received and the specified moment as long as it is ensured that duration of the first time unit is greater than the frequency domain resource switch delay.

For example, if the terminal device receives the first information and the second information in the slot n, and the second information indicates the terminal device to receive the data on the PDSCH of the second frequency domain resource at the start moment of the slot n+2, the start moment of the slot n+2 may be used as an end moment of the first time unit.

The foregoing is merely an example. Alternatively, the length, the start moment, and the end moment of the first time unit may be determined in another manner. Examples are not described one by one herein again.

In this embodiment of this application, the terminal device may perform frequency domain resource switching in the second time unit included in the first time unit. There may be a plurality of implementations for a specific position of the second time unit in the first time unit. In an implementation, the terminal device may independently determine the position. The terminal device may use any moment from the start moment to the end moment of the first time unit as a start moment of the second time unit as long as it is ensured that plenty of time is reserved for the frequency domain resource switching.

In another implementation, the position of the second time unit in the first time unit is indicated by the network device, where the indication of the network device may be sent by using the following signaling: DCI, RRC signaling, a MAC CE, or a system broadcast message; or the position of the second time unit in the first time unit is preset.

The following uses different examples to describe a position relationship between the first time unit and the second time unit.

In an implementation 1, the start moment of the first time unit overlaps the start moment of the second time unit.

In this implementation, after receiving the first information, the terminal device starts a frequency domain resource switching process. After the frequency domain resource switching is completed, the terminal device may perform uplink or downlink data transmission on the second frequency domain resource within a period of time before the end moment of the first time unit.

If the network device schedules the terminal device to perform data transmission on the first frequency domain resource in the first time unit, in this case, the terminal device may switch the data originally transmitted on the first frequency domain resource in the first time unit to the second frequency domain resource for transmission in the period of time other than the second time unit in the first time unit.

As described above, the network device may indicate, by using the third information, the terminal device to switch to the second frequency domain resource for transmission, or the transmission may be independently determined or predefined by the terminal device.

Optionally, when the terminal device performs data transmission on the second frequency domain resource, in an implementation, when the terminal device transmits, on the second frequency domain resource, data originally scheduled on the first frequency domain resource, scheduling information other than frequency domain resource allocation information is the same as scheduling information received on the first frequency domain resource. To be specific, information, for example, a modulation and coding scheme, time domain resource allocation information, and a hybrid automatic repeat request (hybrid automatic repeat request, HARQ) process number in the scheduling information is the same. Further, for the frequency domain resource allocation information, a relative position of a frequency domain resource at which the terminal device performs transmission on the second frequency domain resource may be the same as the frequency domain allocation information in the scheduling information received on the first frequency domain resource.

In another implementation, the network device may alternatively indicate, by using signaling, scheduling information used when the terminal device transmits, on the second frequency domain resource, data originally scheduled on the first frequency domain resource, for example, may re-indicate information of transmission, for example, a modulation and coding scheme, time domain resource information, and frequency domain resource information. In another implementation, scheduling information used when the terminal device transmits the data on the second frequency domain resource may be predefined. In this case, the terminal device transmits, on the second frequency domain resource based on the predefined scheduling information, data originally scheduled on the first frequency domain resource.

Figure 5:
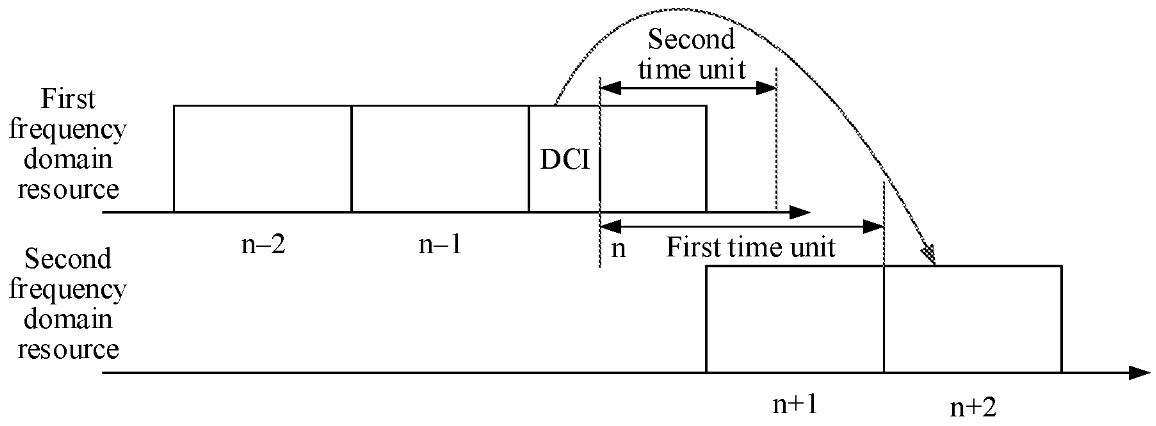
FIG. 5 is a schematic diagram of a position relationship between a first time unit and a second time unit according to an embodiment of this application.

With reference to the foregoing descriptions, for example, as shown in FIG. 5, the terminal device works on the first frequency domain resource before the slot n, and receives DCI in the first three symbols of the slot n, where the DCI includes the first information, the second information, and the third information. The second information indicates the terminal device to perform PDSCH or PUSCH transmission on the second frequency domain resource in the slot n+2. It is assumed that the start moment of the first time unit is a moment at which the DCI is received, and the end moment of the first time unit is an end moment of the slot n+1 (or the start moment of the slot n+2). The start moment of the second time unit is also the moment at which the DCI is received, and an end moment of the second time unit is before the end moment of the first time unit. A specific position is not limited as long as it is ensured that duration of the second time unit is greater than or equal to the frequency domain resource switch delay.

In the slot n and the slot n+1, the network device has scheduled the terminal device to perform PDSCH or PUSCH transmission on the first frequency domain resource. After receiving the DCI, the terminal device immediately starts to perform frequency domain resource switching, and transmits data on the second frequency domain resource before the slot n+2 after switching to the second frequency domain resource. The data is data originally scheduled on the first frequency domain resource in the slot n and the slot n+1. In the slot n+2, the terminal device transmits, on the second frequency domain resource, PDSCH or PUSCH data scheduled by the second information.

Further, in addition to the foregoing descriptions that the data originally transmitted on the first frequency domain resource in the first time unit may be switched to the second frequency domain resource for transmission in the period of time other than the second time unit in the first time unit, the network device may also indicate the terminal device to perform new PDSCH or PUSCH data transmission, or PDCCH or PUCCH channel transmission on the second frequency domain resource in the period of time other than the second time unit in the first time unit. In an implementation, in the period of time other than the second time unit in the first time unit, the network device may configure the terminal device to monitor a PDCCH resource in the second frequency domain resource, and the network device may send DCI to the terminal device on the second frequency domain resource through the PDCCH. The DCI schedules the terminal device to perform PDSCH or PUSCH data transmission in a BWP 2. It should be noted that a time domain position of the PDSCH or PUSCH data transmission is not limited, and may be in the period of time other than the second time unit in the first time unit, or may be in a period of time after the first time unit. The terminal device performs the PDSCH or PUSCH data transmission based on the received DCI.

In an implementation 2, the end moment of the first time unit overlaps an end moment of the second time unit.

In this implementation, if the network device schedules the terminal device to perform data transmission on the first frequency domain resource in the first time unit, in this case, after receiving the first information, the terminal device may reserve, at a last position of the first time unit, duration corresponding to the second time unit, to perform frequency domain resource switching, and may continue to perform the data transmission on the first frequency domain resource within a period of time before the frequency domain resource switching.

Figure 6:
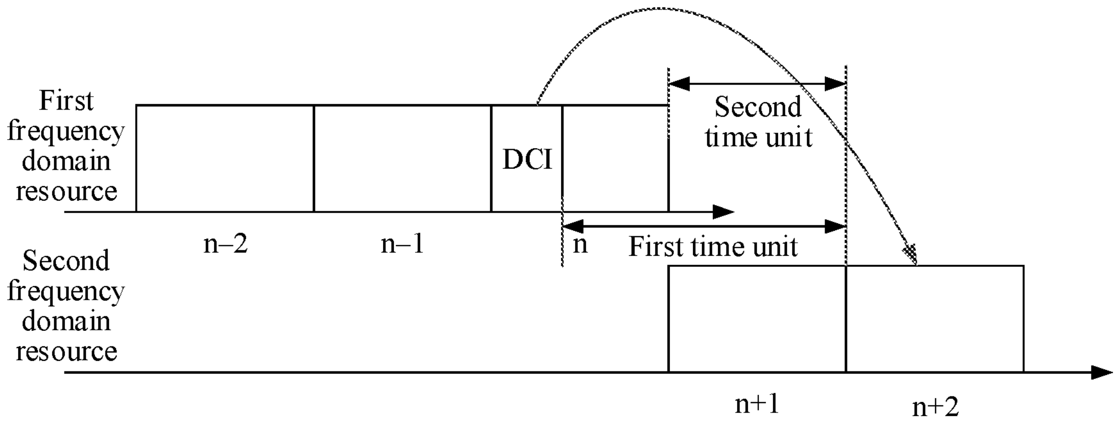
FIG. 6 is a schematic diagram of a position relationship between a first time unit and a second time unit according to an embodiment of this application.

For example, as shown in FIG. 6, the terminal device works on the first frequency domain resource before the slot n, and receives DCI in the first three symbols of the slot n, where the DCI includes the first information, the second information, and the third information. The second information indicates the terminal device to perform PDSCH or PUSCH transmission on the second frequency domain resource in the slot n+2. It is assumed that the start moment of the first time unit is a moment at which the DCI is received, and the end moment of the first time unit is an end moment of the slot n+1 (or the start moment of the slot n+2). The end moment of the second time unit is also the end moment of the slot n+1, and the start moment of the second time unit is after the start moment of the first time unit. A specific position is not limited as long as it is ensured that duration of the second time unit is greater than or equal to the frequency domain resource switch delay.

After receiving the DCI, the terminal device continues to perform the data transmission on the first frequency domain resource until the start moment of the second time unit, and performs frequency domain resource switching. After switching to the second frequency domain resource, in the slot n+2, the terminal device transmits, on the second frequency domain resource, PDSCH or PUSCH data scheduled by the second information.

In an implementation 3, the start moment of the first time unit does not overlap the start moment of the second time unit, and the end moment of the first time unit does not overlap an end moment of the second time unit.

In this implementation, after receiving the first information, the terminal device may perform data transmission on the first frequency domain resource before the start moment of the second time unit. After the end moment of the second time unit and before the end moment of the first time unit, data transmission may be performed on the second frequency domain resource.

Specifically, if the network device schedules the terminal device to perform data transmission on the first frequency domain resource in the first time unit, in this case, before the start moment of the second time unit, the terminal device may continue to perform the data transmission on the first frequency domain resource. After frequency domain resource switching is completed, that is, at the end moment of the second time unit, the terminal device may switch, to the second frequency domain resource for transmission, the data originally transmitted on the first frequency domain resource in the first time unit.

Figure 7:
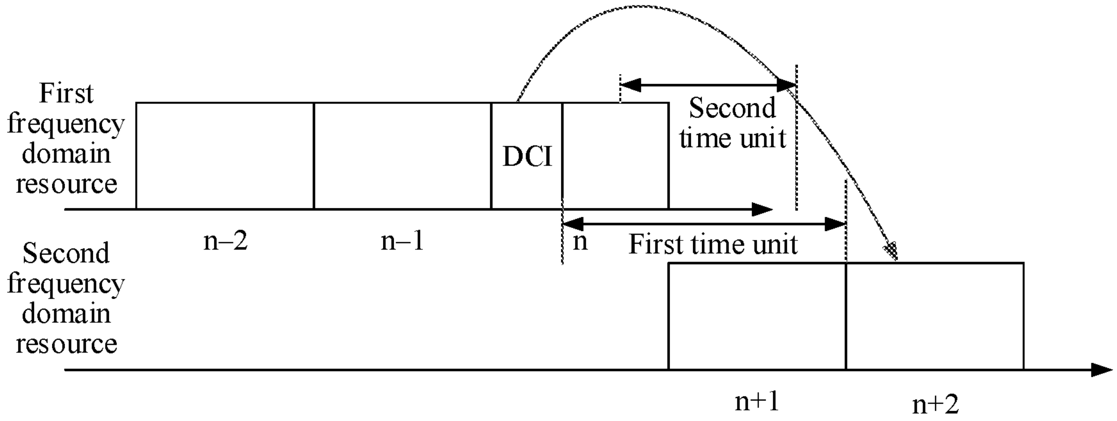
FIG. 7 is a schematic diagram of a position relationship between a first time unit and a second time unit according to an embodiment of this application.

For example, as shown in FIG. 7, the terminal device works on the first frequency domain resource before the slot n, and receives DCI in the first three symbols of the slot n, where the DCI includes the first information, the second information, and the third information. The second information indicates the terminal device to perform PDSCH or PUSCH transmission on the second frequency domain resource in the slot n+2. It is assumed that the start moment of the first time unit is a moment at which the DCI is received, and the end moment of the first time unit is an end moment of the slot n+1 (or the start moment of the slot n+2). The start moment of the second time unit is the moment 1, and the end moment of the second time unit is the moment 2. Both the moment 1 and the moment 2 are in the first time unit.

After receiving the DCI, the terminal device continues to perform the data transmission on the first frequency domain resource until the moment 1, and performs frequency domain resource switching. After switching to the second frequency domain resource, the terminal device transmits, on the second frequency domain resource at the moment 2, data originally scheduled to be transmitted on the first frequency domain resource. In the slot n+2, the terminal device transmits, on the second frequency domain resource, PDSCH or PUSCH data scheduled by the second information.

Further, in the period of time other than the second time unit in the first time unit, the network device may further configure the terminal device to monitor a PDCCH on the first frequency domain resource or the second frequency domain resource. The network device may send DCI to the terminal device through the PDCCH, and the DCI schedules the terminal device to perform PDSCH or PUSCH data transmission on the second frequency domain resource. It should be noted that a time domain position of the PDSCH or PUSCH data transmission is not limited, and may be in the period of time other than the second time unit in the first time unit, or may be in a period of time after the first time unit. The terminal device performs the PDSCH or PUSCH data transmission based on the received DCI.

In this embodiment of this application, when the first information is carried in the DCI, and the frequency domain resource is the BWP, shorter BWP switching may be further introduced.

It is assumed that the terminal device receives, in a downlink time unit n by using a BWP 1, the DCI sent by the network device, where the DCI indicates the BWP 2, and simultaneously schedules PDSCH or PUSCH transmission in the BWP 2. A delay in performing BWP switching by the terminal device may be referred to as a first switch delay, and a BWP switch delay defined in the 3rd generation partnership project (the 3rd generation partnership project, 3GPP) protocol may be referred to as a second switch delay. The first switch delay is less than the second switch delay. Specifically, the first switch delay may include any one of the following implementations.

In an implementation 1, there is no correspondence between the first switch delay and a parameter, for example, a subcarrier spacing (subcarrier spacing, SCS). To be specific, regardless of a specific value of the SCS, the first switch delay is one value. In addition, the first switch delay is less than a minimum BWP switch delay in Table 1.

In an implementation 2, similar to the BWP switch delay in Table 1, values of the first switch delay corresponding to different SCSs may be different. For example, when the SCSs are respectively 15 kHz, 30 kHz, 60 kHz, and 120 kHz, the first switch delay may correspond to different values. When the first switch delay and the second switch delay correspond to a same SCS, the first switch delay is less than the second switch delay.

For example, when corresponding to different SCSs, the values of the first switch delay may be shown in Table 2.

TABLE 2

| | NR slot length | BWP switch delay $T_{BWPswitchDelay}$ (slot) | |
|---|---|---|---|
| μ | (ms) | Type 1 | Type 2 |
| 0 | 1 | Less than 1 | Less than 3 |
| 1 | 0.5 | Less than 2 | Less than 5 |
| 2 | 0.25 | Less than 3 | Less than 9 |
| 3 | 0.125 | Less than 6 | Less than 17 |

μ is a parameter corresponding to a subcarrier spacing at which the terminal device works. It can be learned by comparing Table 1 with Table 2 that, in Table 2, when the first switch delay and the second switch delay correspond to the same SCS, the first switch delay is less than the second switch delay.

In an implementation 3, similar to the BWP switch delay in Table 1, values of the first switch delay corresponding to different SCSs may be different. There is at least one SCS, and when the first switch delay and the second switch delay correspond to an SCS in the at least one SCS, the first switch delay is less than the second switch delay.

For example, when corresponding to different SCSs, the values of the first switch delay may be shown in Table 3.

TABLE 3

| μ | NR slot length (ms) | BWP switch delay $T_{BWPswitchDelay}$ (slot) | |
|---|---|---|---|
| | | Type 1 | Type 2 |
| 0 | 1 | 1 | 3 |
| 1 | 0.5 | 1 | 3 |
| 2 | 0.25 | 3 | 9 |
| 3 | 0.125 | 6 | 17 |

It can be learned by comparing Table 1 with Table 3 that, in Table 3, when the SC S=15 kHz, 60 kHz, or 120 kHz, the first switch delay is equal to the second switch delay, and when the SCS=30 kHz, the first switch delay is less than the second switch delay.

The foregoing is merely an example, and there may be another implementation. Details are not described herein again.

Because BWP switching time is shorter, the terminal device may switch to another BWP more quickly, to obtain a larger frequency diversity gain and load balancing gain. In addition, because the BWP switching time is shorter, data transmission interruption time caused by the BWP switching is shorter. This reduces impact of the BWP switching on the data transmission of the terminal device, and helps increase a data transmission rate of the terminal device. In addition, an enhanced mobile broadband (enhanced mobile broadband, eMBB) or ultra-high reliability and low latency (ultra-high reliability and low latency, URLLC) service can be quickly avoided, thereby ensuring transmission performance of a higher-priority service.

An embodiment of this application further provides a data transmission method, to reduce data transmission interruption duration caused by frequency domain resource switching, and improve data transmission efficiency.

Figure 8:
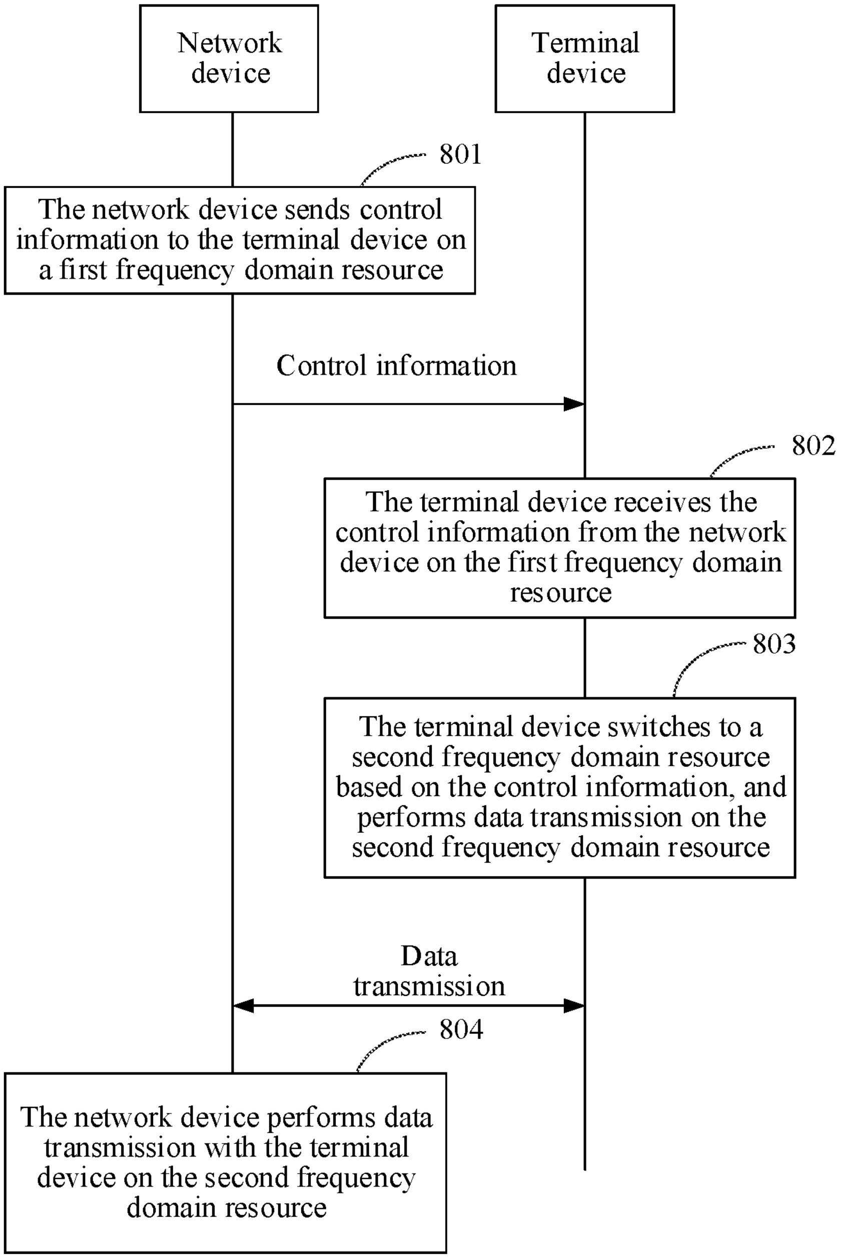
FIG. 8 is a schematic flowchart of a data transmission method according to an embodiment of this application.

FIG. 8 is a schematic flowchart of a data transmission method according to an embodiment of this application. The method includes the following steps.

S801: A network device sends control information to a terminal device on a first frequency domain resource.

S802: The terminal device receives the control information from the network device on the first frequency domain resource.

The control information indicates to perform data transmission on a second frequency domain resource, and indicates a start moment of the data transmission.

S803: The terminal device switches to the second frequency domain resource based on the control information, and performs data transmission on the second frequency domain resource.

S804: The network device performs data transmission with the terminal device on the second frequency domain resource.

An end moment of frequency domain resource switching overlaps (or is the same as) the start moment of the data transmission indicated by the control information.

In an implementation, duration between a start moment of the frequency domain resource switching and the start moment of the data transmission indicated by the control information is greater than or equal to a frequency domain resource switch delay required by the terminal device to perform the frequency domain resource switching.

It should be noted that the frequency domain resource switch delay required by the terminal device to perform the frequency domain resource switching may be determined in a plurality of manners, for example, may be determined in Table 1.

Figure 9:
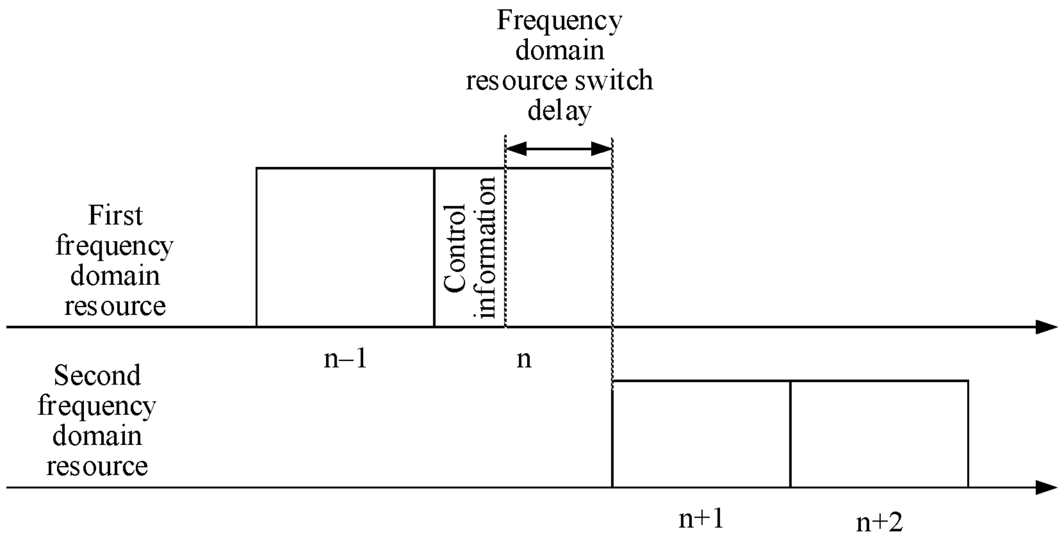
FIG. 9 is a schematic diagram of frequency domain resource switching according to an embodiment of this application.

In an implementation, duration between a moment at which the control information is received or sent and the start moment of the data transmission indicated by the control information is greater than or equal to a frequency domain resource switch delay required by the terminal device to perform the frequency domain resource switching. For example, as shown in FIG. 9, the network device sends the control information in a symbol 5 in a slot n. The start moment of the data transmission is a start moment of a slot n+1. Duration between a start moment of the symbol in the slot n and the start moment of the slot n+1 may be equal to the frequency domain resource switch delay required for the frequency domain resource switching, and the terminal device performs the frequency domain resource switching within the duration.

In an implementation, DCI including the control information may be transmitted at any position in one slot. For example, one slot includes 13 symbols, and the DCI may be in any one of the symbols, which is specifically determined based on an actual situation. Further, a slot in which the terminal device receives the DCI and a slot in which the terminal device completes the frequency domain resource switching based on the DCI are a same slot, and a moment at which the terminal device completes the frequency domain resource switching is an end moment (or referred to as a tail boundary) of the slot. In this case, a period of time from a moment at which the terminal device receives the DCI to the end moment of the slot in which the DCI is received may be equal to a frequency domain resource switch delay required by the terminal device. In this way, when receiving the DCI in one slot, the terminal device immediately performs the frequency domain resource switching. A moment at which the switching is completed is exactly the end moment of the slot. Alternatively, the whole of a control resource set (control resource set, CORESET) in which the DCI is monitored and the frequency domain resource switch delay is aligned with the end moment (or referred to as the tail boundary) of the slot in which the DCI is located. Alternatively, the frequency domain resource switch delay is aligned with the tail boundary of the slot. A moment at which the terminal device receives the DCI in one slot is not later than a specific moment before an end moment of the slot. Duration between the specific moment and the end moment of the slot is the frequency domain resource switch delay.

Figure 10:
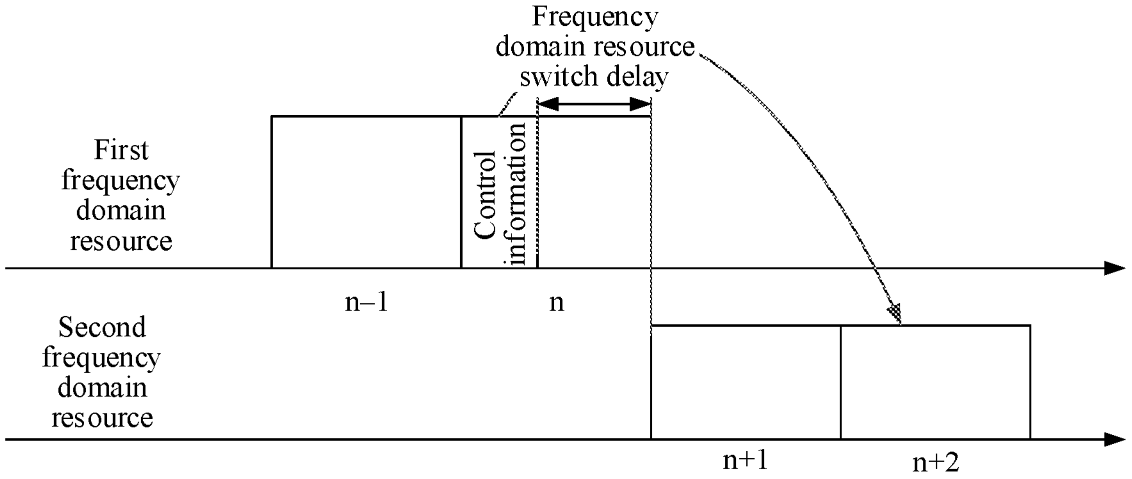
FIG. 10 is a schematic diagram of frequency domain resource switching according to an embodiment of this application.

For example, as shown in FIG. 10, the network device sends the control information in a symbol 6 in a slot n. The start moment of the data transmission is a start moment of a slot n+2. Duration between a start moment of the symbol 6 in the slot n and an end moment of the slot n is equal to the frequency domain resource switch delay required for the frequency domain resource switching, and the terminal device performs the frequency domain resource switching within the duration.

According to the foregoing method, the DCI may be sent and received at any position in the slot. Therefore, frequency domain resource switching triggered by using the DCI is more flexible. In addition, the moment at which the frequency domain resource switching is completed is aligned with the tail boundary of the slot. This can prevent the frequency domain resource switching from crossing a plurality of slots. Therefore, it can be ensured that a complete slot can be for the data transmission in a next slot of the slot. Because the terminal device performs the data transmission based on a slot granularity, implementation of signal receiving and detection of the terminal device is facilitated.

The foregoing embodiments may be implemented separately, or may be implemented in combination with each other. In the foregoing, in different embodiments, differences between embodiments are described in emphasis. For content other than the differences between different embodiments, reference may be made to each other. Step numbers in the flowcharts described in embodiments are merely examples of execution procedures, and do not constitute a limitation on an execution sequence of the steps. In embodiments of this application, there is no strict execution sequence between steps that have no time sequence dependency relationship with each other. In addition, not all the steps shown in the flowcharts are mandatory steps, and some steps may be added or deleted based on the flowcharts according to an actual requirement.

In the foregoing embodiments provided in this application, the methods provided in embodiments of this application are described from a perspective of interaction between devices. To implement functions in the methods provided in the foregoing embodiments of this application, an access network device or the terminal device may include a hardware structure and/or a software module, and the foregoing functions are implemented in a form of the hardware structure, the software module, or a combination of the hardware structure and the software module. Whether a specific function in the foregoing functions is performed by the hardware structure, the software module, or the combination of the hardware structure and the software module depends on a particular application and a design constraint of the technical solutions.

In embodiments of this application, module division is an example, and is merely a logical function division. In actual implementation, another division manner may be used. In addition, functional modules in embodiments of this application may be integrated into one processor, or each of the modules may exist alone physically, or two or more modules are integrated into one module. The integrated module may be implemented in a form of hardware, or may be implemented in a form of a software functional module.

Figure 11:
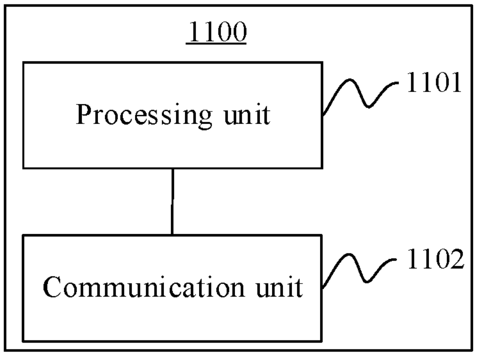
FIG. 11 is a schematic diagram of a structure of a communication apparatus according to an embodiment of this application.

Same as the foregoing concept, as shown in FIG. 11, an embodiment of this application further provides an apparatus 1100, configured to implement a function of the access network device or the terminal device in the foregoing method. For example, the apparatus may be a software module or a chip system. In this embodiment of this application, the chip system may include a chip, or may include a chip and another discrete device. The apparatus 1100 may include a processing unit 1101 and a communication unit 1102.

In this embodiment of this application, the communication unit may also be referred to as a transceiver unit, and may include a sending unit and/or a receiving unit, respectively configured to perform sending and receiving steps of the access network device or the terminal device in the foregoing method embodiments.

Figure 12:
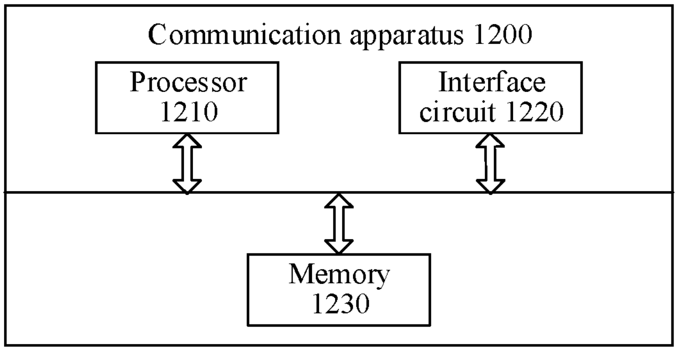
FIG. 12 is a schematic diagram of a structure of a communication apparatus according to an embodiment of this application.

The following describes in detail communication apparatuses provided in embodiments of this application with reference to FIG. 11 and FIG. 12. It should be understood that the descriptions of the apparatus embodiments correspond to the descriptions of the method embodiments. Therefore, for content that is not described in detail, refer to the foregoing method embodiments. For brevity, details are not described herein again.

The communication unit may also be referred to as a transceiver, a transceiver machine, a transceiver apparatus, or the like. The processing unit may also be referred to as a processor, a processing board, a processing module, a processing apparatus, or the like. Optionally, a device configured to implement a receiving function in the communication unit 1102 may be considered as a receiving unit, and a device configured to implement a sending function in the communication unit 1102 may be considered as a sending unit. To be specific, the communication unit 1102 includes the receiving unit and the sending unit. The communication unit sometimes may also be referred to as a transceiver machine, a transceiver, a transceiver circuit, or the like. The receiving unit sometimes may also be referred to as a receiver machine, a receiver, a receiver circuit, or the like. The sending unit sometimes may also be referred to as a transmitting machine, a transmitter, a transmit circuit, or the like.

When the communication apparatus 1100 performs a function of the terminal device in the procedure shown in FIG. 3 in the foregoing embodiment, the communication unit is configured to receive first information from a network device on a first frequency domain resource, where the first information indicates to switch to a second frequency domain resource.

The processing unit is configured to: determine a first time unit based on the first information, where the first time unit includes a second time unit, and switch from the first frequency domain resource to the second frequency domain resource in the second time unit.

The communication unit is configured to perform data transmission on the first frequency domain resource and/or the second frequency domain resource in a period of time other than the second time unit in the first time unit.

When the communication apparatus 1100 performs a function of the network device in the procedure shown in FIG. 3 in the foregoing embodiment, the processing unit is configured to send first information to a terminal device on a first frequency domain resource through the communication unit, where the first information indicates to switch to a second frequency domain resource.

The processing unit is configured to perform data transmission on the first frequency domain resource and/or the second frequency domain resource in a period of time other than a second time unit in a first time unit through the communication unit.

The first information indicates the first time unit, the first time unit includes the second time unit, and the second time unit is for switching from the first frequency domain resource to the second frequency domain resource.

The foregoing is merely an example. The processing unit 1101 and the communication unit 1102 may further perform other functions. For a more detailed description, refer to the related descriptions in the method embodiments shown in FIG. 3. Details are not described herein.

The communication apparatus 1100 may further perform the method shown in FIG. 8. Details are not described herein.

FIG. 12 shows an apparatus 1200 according to an embodiment of this application. The apparatus shown in FIG. 12 may be an implementation of a hardware circuit of the apparatus shown in FIG. 11. The communication apparatus is applicable to the flowchart shown above, and performs a function of the terminal device or the access network device in the foregoing method embodiments. For ease of description, FIG. 12 shows only main components of the communication apparatus.

As shown in FIG. 12, the communication apparatus 1200 includes a processor 1210 and an interface circuit 1220. The processor 1210 and the interface circuit 1220 are coupled to each other. It may be understood that the interface circuit 1220 may be a transceiver, a pin, an interface circuit, or an input/output interface. Optionally, the communication apparatus 1200 may further include a memory 1230, configured to: store instructions executed by the processor 1210, store input data required by the processor 1210 to run the instructions, or store data generated after the processor 1210 runs the instructions.

When the communication apparatus 1200 is configured to implement the method shown in FIG. 6, the processor 1210 is configured to implement a function of the processing unit 1101, and the interface circuit 1220 is configured to implement a function of the communication unit 1102.

The communication apparatus 1200 may further perform the method shown in FIG. 8. Details are not described herein.

When the communication apparatus is a chip used in the terminal device, the chip in the terminal device implements a function of the terminal device in the foregoing method embodiments. The chip in the terminal device receives information from another module (for example, a radio frequency module or an antenna) in the terminal device, where the information is sent by the access network device to the terminal device. Alternatively, the chip in the terminal device sends information to another module (for example, a radio frequency module or an antenna) in the terminal device, where the information is sent by the terminal device to the access network device.

When the communication apparatus is a chip used in the access network device, the chip in the access network device implements a function of the access network device in the foregoing method embodiments. The chip in the access network device receives information from another module (for example, a radio frequency module or an antenna) in the access network device, where the information is sent by the terminal device to the access network device. Alternatively, the chip in the access network device sends information to another module (for example, a radio frequency module or an antenna) in the access network device, where the information is sent by the access network device to the terminal device.

It may be understood that, the processor in this embodiment of this application may be a central processing unit, or may be another general-purpose processor, a digital signal processor, an application-specific integrated circuit or another programmable logic device, a transistor logic device, a hardware component, or any combination thereof. The general-purpose processor may be a microprocessor, or may be any conventional processor.

The memory in this embodiment of this application may be a random access memory, a flash memory, a read-only memory, a programmable read-only memory, an erasable programmable read-only memory, an electrically erasable programmable read-only memory, a register, a hard disk, a removable hard disk, or any other form of storage medium well-known in the art.

A person skilled in the art should understand that embodiments of this application may be provided as a method, a system, or a computer program product. Therefore, this application may use a form of a hardware-only embodiment, a software-only embodiment, or an embodiment with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of the claims of this application and their equivalent technologies.

What is claimed is:

1. A method, wherein the method comprises:

receiving, by a terminal device, first information from a network device on a first frequency domain resource, wherein the first information indicates the terminal device to switch to a second frequency domain resource;

determining, by the terminal device, a first time unit based on the first information, wherein the first time unit is for the terminal device to perform a bandwidth part (BWP) switching process, and wherein the first time unit comprises a second time unit;

switching, by the terminal device, from the first frequency domain resource to the second frequency domain resource in the second time unit;

performing, by the terminal device, data transmission on at least one of the first frequency domain resource or the second frequency domain resource in a period of time other than the second time unit in the first time unit; and receiving, by the terminal device, second information from the network device, wherein the second information indicates the terminal device to transmit data on the second frequency domain resource at a specified moment, and the second information and the first information are comprised in a same message;

wherein an end moment of the first time unit is the specified moment indicated by the second information.

2. The method according to claim 1, wherein performing the data transmission on at least one of the first frequency domain resource or the second frequency domain resource in the period of time other than the second time unit in the first time unit comprises at least one of:

performing the data transmission on the first frequency domain resource between a start moment of the first time unit and a start moment of the second time unit; or performing the data transmission on the second frequency domain resource between an end moment of the second time unit and an end moment of the first time unit.

3. The method according to claim 1, wherein:

a start moment of the first time unit is after a moment at which the first information is received; and the first information further indicates at least one of a length, the start moment, or an end moment of the first time unit.

4. The method according to claim 1, wherein the method further comprises:

receiving, by the terminal device, third information from the network device, wherein the third information indicates the terminal device to perform transmission by using at least one of the first frequency domain resource or the second frequency domain resource in the period of time other than the second time unit in the first time unit.

5. The method according to claim 1, wherein:

a position of the second time unit in the first time unit is indicated by the network device; or a position of the second time unit in the first time unit is preset.

6. The method according to claim 1, wherein a start moment of the first time unit overlaps a start moment of the second time unit, or an end moment of the first time unit overlaps an end moment of the second time unit.

7. The method according to claim 1, wherein the first frequency domain resource and the second frequency domain resource have different index values, or the first frequency domain resource and the second frequency domain resource have a same index value and different frequency domain positions.

8. A method, wherein the method comprises:

sending, by a network device, first information to a terminal device on a first frequency domain resource, wherein the first information indicates the terminal device to switch to a second frequency domain resource;

performing, by the network device, data transmission on at least one of the first frequency domain resource or the second frequency domain resource in a period of time other than a second time unit in a first time unit, wherein the first information indicates the first time unit for the terminal device to perform a bandwidth part (BWP) switching process, the first time unit comprises the second time unit, and the second time unit is for switching from the first frequency domain resource to the second frequency domain resource; and sending, by the network device, second information to the terminal device, wherein the second information indicates the terminal device to transmit data on the second frequency domain resource at a specified moment, and the second information and the first information are comprised in a same message; and wherein an end moment of the first time unit is the specified moment indicated by the second information.

9. The method according to claim 8, wherein performing the data transmission on at least one of the first frequency domain resource or the second frequency domain resource in the period of time other than the second time unit in the first time unit comprises at least one of:

performing the data transmission on the first frequency domain resource between a start moment of the first time unit and a start moment of the second time unit; or performing the data transmission on the second frequency domain resource between an end moment of the second time unit and an end moment of the first time unit.

10. The method according to claim 8, wherein:

a start moment of the first time unit is after a moment at which the first information is received; and the first information further indicates at least one of a length, the start moment, or an end moment of the first time unit.

11. The method according to claim 8, wherein the method further comprises:

sending, by the network device, third information to the terminal device, wherein the third information indicates the terminal device to perform transmission by using at least one of the first frequency domain resource or the second frequency domain resource in the period of time other than the second time unit in the first time unit.

12. The method according to claim 8, wherein:

a position of the second time unit in the first time unit is indicated by the network device; or a position of the second time unit in the first time unit is preset.

13. The method according to claim 8, wherein a start moment of the first time unit overlaps a start moment of the second time unit, or an end moment of the first time unit overlaps an end moment of the second time unit.

14. The method according to claim 8, wherein the first frequency domain resource and the second frequency domain resource have different index values, or the first frequency domain resource and the second frequency domain resource have a same index value and different frequency domain positions.

15. An apparatus, comprising:

at least one processor; and at least one memory coupled to the at least one processor and storing programming instructions for execution by the at least one processor to perform operations comprising:

receiving first information from a network device on a first frequency domain resource, wherein the first information indicates the apparatus to switch to a second frequency domain resource;

determining a first time unit based on the first information, wherein the first time unit is for the apparatus to perform a bandwidth part (BWP) switching process, and wherein the first time unit comprises a second time unit;

switching from the first frequency domain resource to the second frequency domain resource in the second time unit;

performing data transmission on at least one of the first frequency domain resource or the second frequency domain resource in a period of time other than the second time unit in the first time unit; and receiving second information from the network device, wherein the second information indicates the apparatus to transmit data on the second frequency domain resource at a specified moment, and the second information and the first information are comprised in a same message; and wherein an end moment of the first time unit is the specified moment indicated by the second information.

16. The apparatus according to claim 15, wherein performing the data transmission on at least one of the first frequency domain resource or the second frequency domain resource in the period of time other than the second time unit in the first time unit comprises at least one of:

performing the data transmission on the first frequency domain resource between a start moment of the first time unit and a start moment of the second time unit; or performing the data transmission on the second frequency domain resource between an end moment of the second time unit and an end moment of the first time unit.

17. The apparatus according to claim 15, wherein:

a start moment of the first time unit is after a moment at which the first information is received; and the first information further indicates at least one of a length, the start moment, or an end moment of the first time unit.

* * * * *